(12) United States Patent
Wang et al.

(10) Patent No.: US 9,423,916 B2
(45) Date of Patent: Aug. 23, 2016

(54) IN-CELL TOUCH PANEL AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Haisheng Wang, Beijing (CN); Xue Dong, Beijing (CN); Cheng Li, Beijing (CN); Xiaoliang Ding, Beijing (CN); Hongjuan Liu, Beijing (CN); Shengji Yang, Beijing (CN); Weijie Zhao, Beijing (CN); Yingming Liu, Beijing (CN); Tao Ren, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/344,843

(22) PCT Filed: Jul. 10, 2013

(86) PCT No.: PCT/CN2013/079134
§ 371 (c)(1),
(2) Date: Mar. 13, 2014

(87) PCT Pub. No.: WO2014/169538
PCT Pub. Date: Oct. 23, 2014

(65) Prior Publication Data
US 2015/0268762 A1    Sep. 24, 2015

(30) Foreign Application Priority Data

Apr. 19, 2013 (CN) .......................... 2013 1 0139119

(51) Int. Cl.
*G06F 3/044* (2006.01)
*G02F 1/1333* (2006.01)
(Continued)

(52) U.S. Cl.
CPC ........... *G06F 3/044* (2013.01); *G02F 1/13338* (2013.01); *G06F 3/045* (2013.01);
(Continued)

(58) Field of Classification Search
CPC ............................. G06F 3/044; G06F 3/0412
See application file for complete search history.

(56) References Cited

U.S. PATENT DOCUMENTS

| 7,872,721 B2 | 1/2011 | Oh et al. |
| 2009/0160822 A1* | 6/2009 | Eguchi et al. ................ 345/174 |

(Continued)

FOREIGN PATENT DOCUMENTS

| CN | 101281315 A | 10/2008 |
| CN | 102937845 A | 2/2013 |

(Continued)

OTHER PUBLICATIONS

International Search Report mailed Jan. 23, 2014; PCT/CN2013/079134.
(Continued)

*Primary Examiner* — Shaheda Abdin
(74) *Attorney, Agent, or Firm* — Ladas & Parry LLP

(57) ABSTRACT

An in-cell touch panel and a display device are configured to address mutual interference between touch signals and image display signals and increase opening ratio of the in-cell touch panel at the same time. The in-cell touch panel includes a color filter substrate and an array substrate disposed opposite to form a cell, a plurality of sub-pixel units arranged in matrix are disposed on said array substrate, and further includes: a plurality of touch sensing electrodes distributed in a column direction of said sub-pixel units on said color filter substrate, and a plurality of touch driving electrodes distributed in a row direction of said sub-pixel units on said array substrate, every two adjacent rows of sub-pixel units constituting a sub-pixel unit group and gate lines for providing gate signals to these two rows of sub-pixel units being disposed between these two rows of sub-pixel units; wherein said touch driving electrodes are located in non-display areas between said sub-pixel unit groups.

9 Claims, 13 Drawing Sheets

(51) Int. Cl.
  *G06F 3/041* (2006.01)
  *G06F 3/045* (2006.01)
  *G02F 1/1343* (2006.01)

(52) U.S. Cl.
  CPC ...... *G06F 3/0412* (2013.01); *G02F 1/134309* (2013.01); *G06F 2203/04101* (2013.01); *G06F 2203/04104* (2013.01); *G06F 2203/04107* (2013.01); *G06F 2203/04111* (2013.01); *G06F 2203/04112* (2013.01)

(56) References Cited

U.S. PATENT DOCUMENTS

| | | | |
|---|---|---|---|
| 2011/0141038 A1* | 6/2011 | Kuo et al. | 345/173 |
| 2014/0104510 A1 | 4/2014 | Wang et al. | |
| 2014/0111710 A1 | 4/2014 | Yang et al. | |

FOREIGN PATENT DOCUMENTS

| | | |
|---|---|---|
| CN | 102937853 A | 2/2013 |
| CN | 102955635 A | 3/2013 |
| CN | 203178980 A | 9/2013 |

OTHER PUBLICATIONS

Second Chinese Office Action dated Sep. 28, 2015; Appln. No. 201310139119.2.

International Preliminary Report on Patentability issued Oct. 20, 2015; PCT/CN2013/079134.

First Chinese Office Action dated Jul. 2, 2015; Appln. No. 201310139119.2.

Third Chinese Office Action dated Jan. 4, 2016; Appl. No. 201310139119.2.

* cited by examiner

IN-CELL TOUCH PANEL AND DISPLAY DEVICE

TECHNICAL FIELD

Embodiments of the present invention relate to an in-cell touch panel and a display device.

BACKGROUND

An in-cell touch panel is a device that integrates a touch panel and a display screen. The touch driving electrode and the touch sensing electrode are integrated in the display screen to implement touch and image display functions at the same time. In-cell touch panels have gradually become the main stream in display field due to their simple, light and thin structure and low costs.

Referring to FIG. 1, FIG. 1 shows transversely disposed touch driving electrodes 800 and longitudinally disposed touch sensing electrodes 900. Coupling between adjacent touch driving electrode 800 and touch sensing electrode 900 generates a mutual capacitance $C_m$. When a finger touches the screen, the touch of finger would change the value of said mutual capacitance $C_m$. A touch detection device detects the location of finger touch point by detecting the current change of the capacitance $C_m$ before and after touch.

In an in-cell touch panel, in order to improve the touch effect of the touch panel, touch driving electrodes and touch sensing electrodes have large areas, therefore touch signals will interfere with image display signals. At the same time, image display signals will interfere with touch signals too. Furthermore, touch driving electrodes and touch sensing electrodes with large areas would reduce opening ratio of a touch panel.

SUMMARY

Embodiments of the present invention provide an in-cell touch panel and a display device for addressing mutual interference between touch signals and image display signals and increasing opening ratio of the in-cell touch panel at the same time.

One aspect of the present invention provides an in-cell touch panel including: a color filter substrate and an array substrate disposed in a cell-assembling manner, a plurality of sub-pixel units arranged in matrix being disposed on said array substrate. Said touch panel further includes: a plurality of touch sensing electrodes distributed in a column direction of said sub-pixel units on said color filter substrate, and a plurality of touch driving electrodes distributed in a row direction of said sub-pixel units on said array substrate. Every two adjacent rows of sub-pixel units constitute one sub-pixel unit group. Two gate lines for providing gate signals to these two rows of sub-pixel units are disposed between these two rows of sub-pixel units, wherein said touch driving electrodes are located in non-display areas between said sub-pixel unit groups.

Preferably, said touch driving electrodes comprise a plurality of touch driving electrode sub-units parallel with each other and distributed in the row direction and the touch driving electrode sub-units are connected in parallel with each other.

Preferably, a longitudinal width of the touch driving electrode constituted by a plurality of touch driving electrode sub-units is 2 mm~6 mm.

Preferably, the touch panel further includes a plurality of common electrode signal lines distributed in the row direction of said sub-pixel units on said array substrate, which comprising first common electrode signal lines and second common electrode signal lines.

Said first common electrode signal lines are located between said adjacent touch driving electrodes and in non-display areas between any two adjacent sub-pixel unit groups. Said second common electrode signal lines are said plurality of touch driving electrodes driven in a time-division manner.

Preferably, said first common electrode signal lines and second common electrode signal lines are alternatively arranged.

Preferably, the touch panel further includes common electrodes located on said array substrate and located over said common electrode signal lines, the common electrodes are electrically connected with said common electrode signal lines, and the common electrodes have no overlapping surfaces in vertical direction with said touch driving electrodes.

Preferably, the touch panel further includes common electrodes located on said array substrate and located over said common electrode signal lines, the common electrodes are electrically connected with said common electrode signal lines, the common electrodes are provided with a plurality of slits in regions corresponding to said touch driving electrodes, and areas of overlapping surfaces in vertical direction between the common electrodes and said touch driving electrodes areas of said slits.

Preferably, said touch sensing electrodes are of grid like, the grid-like touch sensing electrodes comprise first touch sensing sub-electrodes distributed in row direction and second touch sensing sub-electrodes distributed in column direction, said first touch sensing sub-electrodes and said second touch sensing sub-electrodes are electrically connected.

Preferably, the touch panel further includes a plurality of data lines distributed in the column direction located on said array substrate and located on non-display areas, said first touch sensing sub-electrodes are located in regions corresponding to said gate lines and said second touch sensing sub-electrodes are located in regions corresponding to said data lines.

Embodiments of the present invention provide a display device including the above-mentioned in-cell touch panel.

In the in-cell touch panel provided in embodiments of the present invention, since gate lines and touch driving electrodes are located at different areas on the array substrate, that is, the gate lines and touch driving electrodes have no vertical overlapping areas, touch driving signals of the touch driving electrodes will not influence gate scanning signals of the gate lines, hence avoiding influence of touch driving signals on image signals. Further, touch driving electrodes are disposed in non-display areas, that is, areas corresponding to the black matrix on the color filter substrate, thereby will not influence the opening ratio of the touch panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
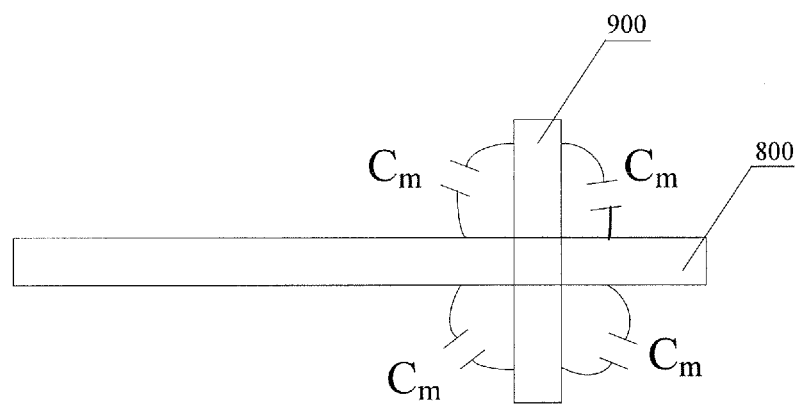
FIG. 1 is a principle diagram of touch driving electrodes and touch sensing electrodes forming mutual capacitance.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present invention provide an in-cell touch panel and a display device for addressing the issue of mutual interference between touch signals and image display signals and increasing opening ratio of the in-cell touch panel at the same time.

One embodiment of the present invention provides an in-cell touch panel in which every two rows of adjacent sub-pixel units constitute one sub-pixel unit group. Two gate lines are provided between said two rows of adjacent sub-pixel units for providing gate signals to the two rows of sub-pixel units respectively. Touch driving electrodes are located between adjacent sub-pixel unit groups. Gate lines and touch driving electrodes are located at different areas on the array substrate and have no vertical overlapping areas, therefore touch driving signals of the touch driving electrodes will not influence gate scanning signals of the gate lines, hence avoiding influence of touch driving signals on image signals. Further, touch driving electrodes are disposed in non-display areas, that is, areas corresponding to the black matrix on the color filter substrate, thereby will not influence the opening ratio of pixels.

The in-cell touch panel provided in one embodiment of the present invention may be a liquid crystal display screen with touch function or an organic luminescent display screen with touch function.

The technical solution provided in embodiments of the present invention will be described in detail below with reference to figures with a liquid crystal display as an example.

Firstly, arrangement of the thin film transistor TFT array substrate provided in embodiments of the present invention will be explained.

Figure 2:
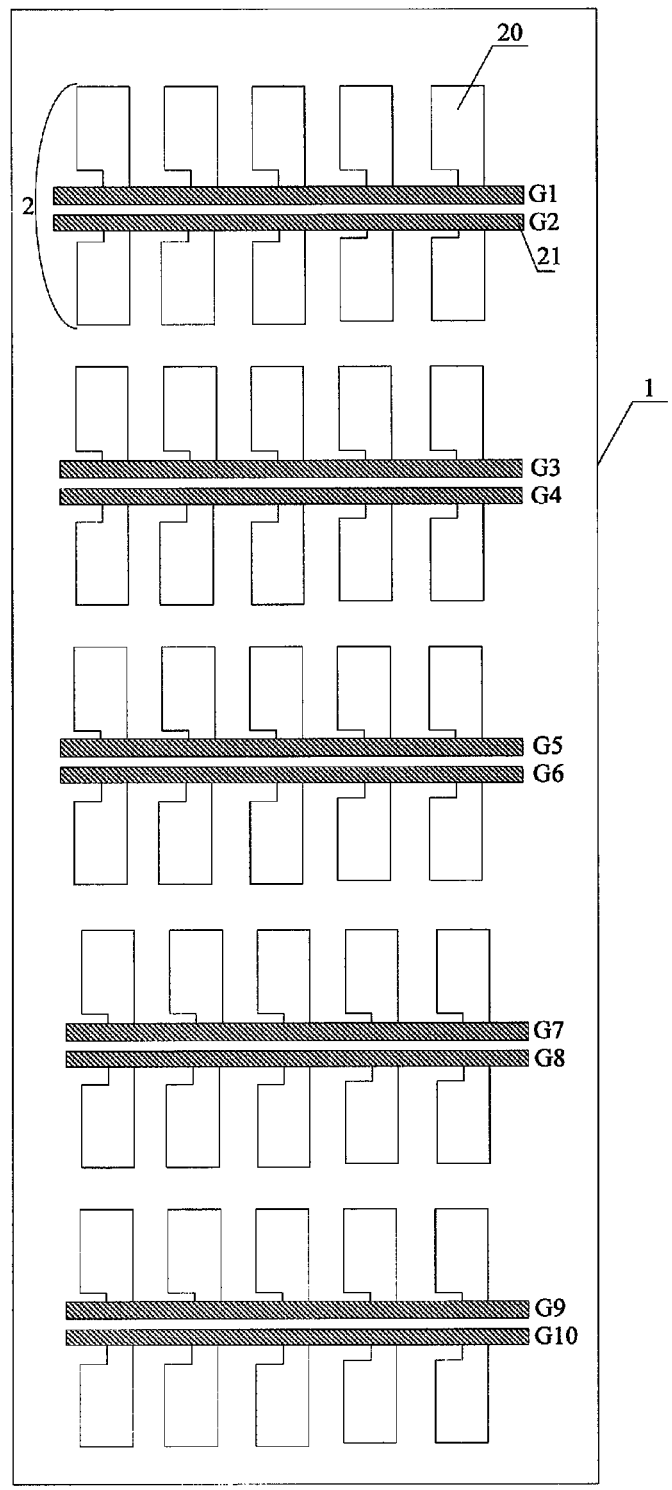
FIG. 2 is a schematic diagram of arrangement of array substrate sub-pixel units provided in one embodiment of the present invention.

Referring to FIG. 2, the thin film transistor TFT array substrate includes: a first substrate 1; a plurality of sub-pixel units 20 distributed in matrix on the first substrate 1, in which two rows of adjacent sub-pixel units 20 constitute one sub-pixel unit group 2; and two gate lines 21 provided between two rows of adjacent sub-pixel units 20 in a sub-pixel unit group 2 for respectively providing gate scanning signals to the two rows of sub-pixel units 20.

Gate lines located in different sub-pixel unit groups 2 shown in FIG. 2 may be identified as G1, G2, G3, . . . , G9 and G10 respectively.

The touch driving electrodes of the in-cell touch panel provided in embodiments of the present invention are disposed on an array substrate shown in FIG. 2, for example, in non-display areas between sub-pixel unit groups 2.

Figure 3:
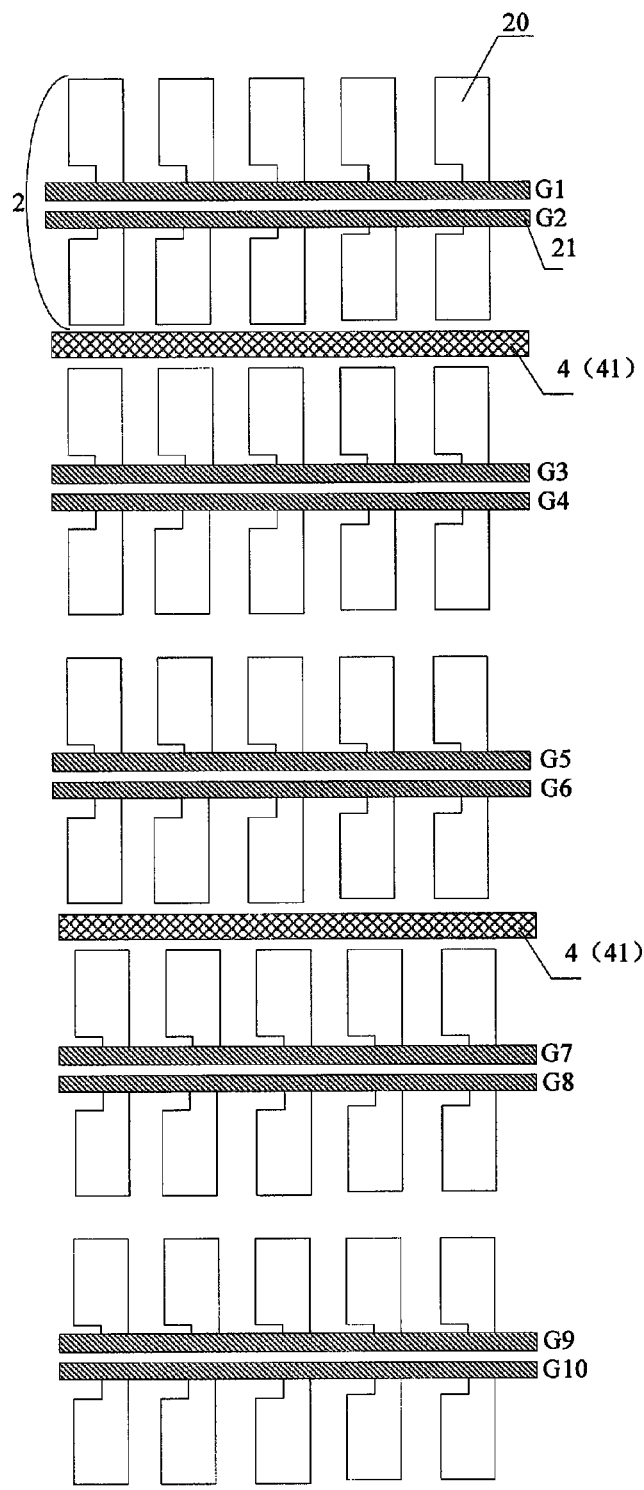
FIG. 3 is a schematic top view of an in-cell touch panel including a first arrangement of touch driving electrodes provided in one embodiment of the present invention.

Arrangement of touch driving electrodes includes at least two types:

Mode I: as shown in FIG. 3, a touch driving electrode 4 includes one touch driving sub-electrode 41. The touch driving sub-electrode 41 (4) is disposed in a non-display area between adjacent two rows of sub-pixel unit groups 2.

A touch driving electrode 4 may be disposed between any two adjacent sub-pixel unit groups 2 or between two partially adjacent sub-pixel unit groups 2. In specific implementation, the arrangement density of touch driving electrodes on the array substrate should be set depending on practical touch precision requirements.

Figure 4:
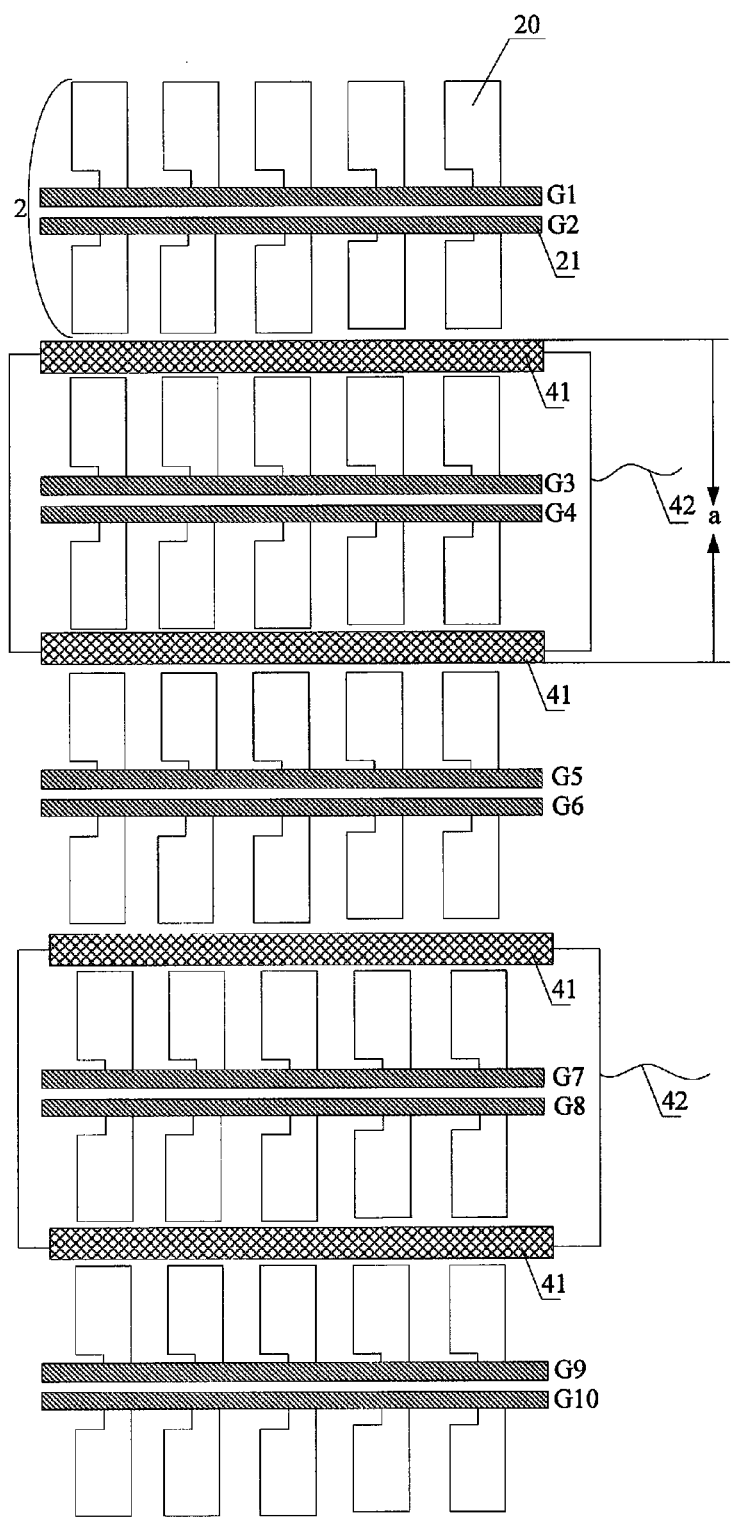
FIG. 4 is a schematic top view of an in-cell touch panel including a second arrangement of touch driving electrodes provided in one embodiment of the present invention.

Mode II: as shown in FIG. 4, a touch driving electrode 4 includes at least two (namely a plurality of) touch driving sub-electrodes 41. Each touch driving sub-electrode 41 is disposed between two adjacent sub-pixel unit groups 2. The plurality of touch driving sub-electrodes 41 are connected in parallel, for example, via leads 42 at peripheral of the array substrate.

Preferably, said touch driving electrodes and said gate lines provided in embodiments of the present invention are disposed on the same layer.

The touch driving electrodes provided in said mode I has a narrow longitudinal (i.e., column direction) width on the order of micron. The touch driving electrodes provided in mode II has a wide width on the order of millimeter.

Preferably, the touch driving electrodes provided in mode II may have a longitudinal width set in a range of 2 mm~6 mm. The longitudinal width of a touch driving electrode is the longest distance between two touch driving sub-electrodes. The longitudinal width of the touch driving electrode shown in FIG. 4 is a.

Figure 5:
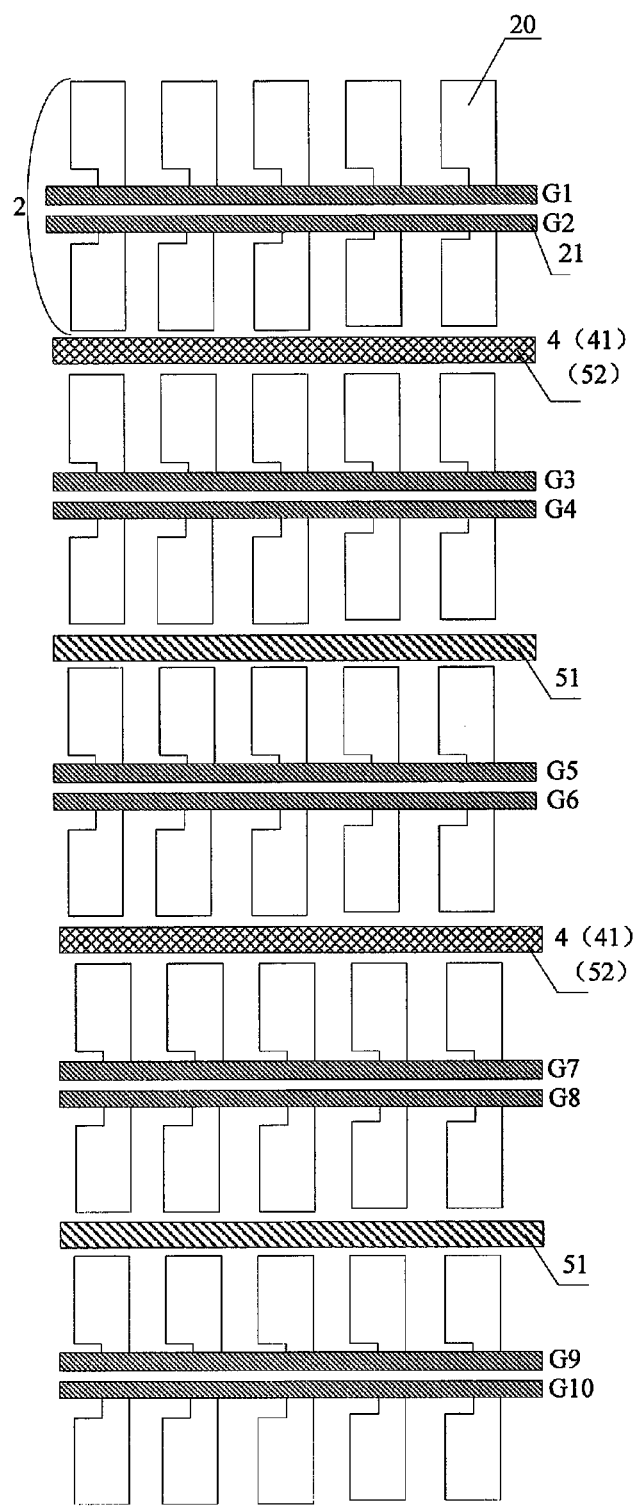
FIG. 5 is a schematic top view of an in-cell touch panel including common electrode signal lines provided in one embodiment of the present invention.

FIG. 5 is a structural representation showing that common electrode signal lines are disposed on the array substrate shown in FIG. 3.

The array substrate further includes a plurality of common electrode signal lines distributed in the row direction of sub-pixel units 20. The common electrode signal lines include first common electrode signal lines 51 and second common electrode signal lines 52.

First common electrode signal lines 51 are electrode lines between adjacent touch driving electrodes 4 (41) and in non-display areas between any two adjacent sub-pixel unit groups 2, and second common electrode signal lines 52 are a plurality of touch driving electrodes 4 (41) (52) driven in a time-division manner. That is, the plurality of touch driving electrodes 4 (41) (52) are driven in a time-division manner. In an image display stage, they are driven to provide voltage signals to common electrodes for image display; and in a touch stage, they are driven to implement touch function.

The touch driving electrode shown in FIG. 5 consists of only one touch driving sub-electrode.

Preferably, as shown in FIG. 5, first common electrode signal lines 51 and second common electrode signal lines 52 are alternatively arranged.

Said common electrode signal lines are configured to provide voltage signals (i.e., $V_{com}$ voltage signals) to the common electrodes. The common electrode signal lines provided in embodiments of the present invention are located in image display areas (i.e., A-A area) of the array substrate and in the non-display areas between sub-pixel units in the A-A area. These common electrode signal lines provide $V_{com}$ voltage to common electrodes over them and the $V_{com}$ voltage of the common electrodes is more stable.

In a specific implementation, strip electrodes located on the same layer as gate lines are disposed between any adjacent sub-pixel unit groups of the array substrate. All strip electrodes serve as common electrode signal lines in the image display stage and part of said strip electrodes serve as touch driving electrodes in the touch stage, which both increases opening ratio of pixels and provides stable $V_{com}$ voltage to common electrodes.

Figure 6:
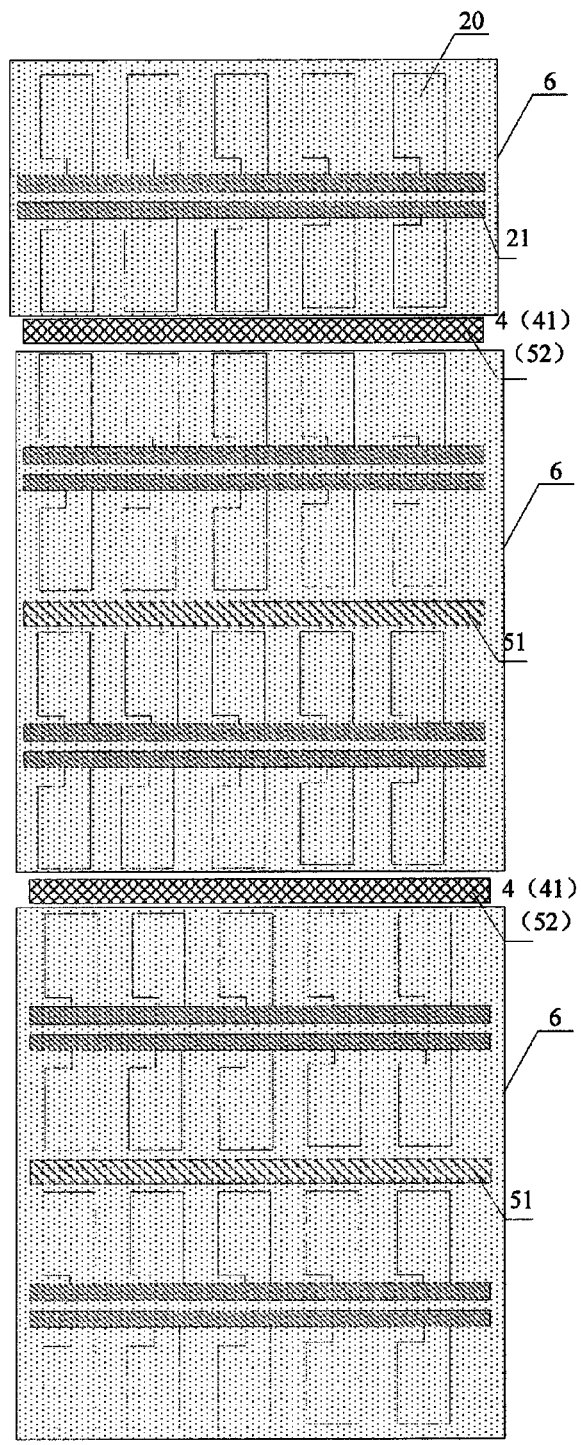
FIG. 6 is a schematic top view of an in-cell touch panel including a first arrangement of common electrodes provided in one embodiment of the present invention.

Referring to FIG. 6, the touch panel provided in embodiments of the present invention further includes common electrodes 6 on the color filter substrate. The common electrodes 6 are located over and insulated with gate lines 21, first common electrode signal lines 51 and second common electrode signal lines 52. Common electrodes 6 are electrically connected with first common electrode signal lines 51 and second common electrode signal lines 52 through vias. First common electrode signal lines 51 and second common electrode signal lines 52 are connected with respective chip ICs or driver circuits via leads on periphery regions on the array substrate. First common electrode signal lines 51 and second common electrode signal lines 52 provide stable $V_{com}$ voltage signals to the common electrodes 6.

Preferably, as shown in FIG. 6, common electrodes 6 and touch driving electrodes 4 have no overlapping surface in vertical direction. This can guarantee signal exchange between touch driving electrodes 4 and touch sensing electrodes for touch function of high sensitivity.

Common electrodes 6 shown in FIG. 6 are mutually independent and gaps between neighbor common electrodes 6 correspond to touch driving electrodes 4.

Common electrodes 6 shown in FIG. 6 are mutually independent. However, resistance values of common electrodes 6 are different due to different areas and $V_{com}$ signals received by common electrodes 6 are non-uniform, which is disadvantageous for high quality image display.

Figure 7:
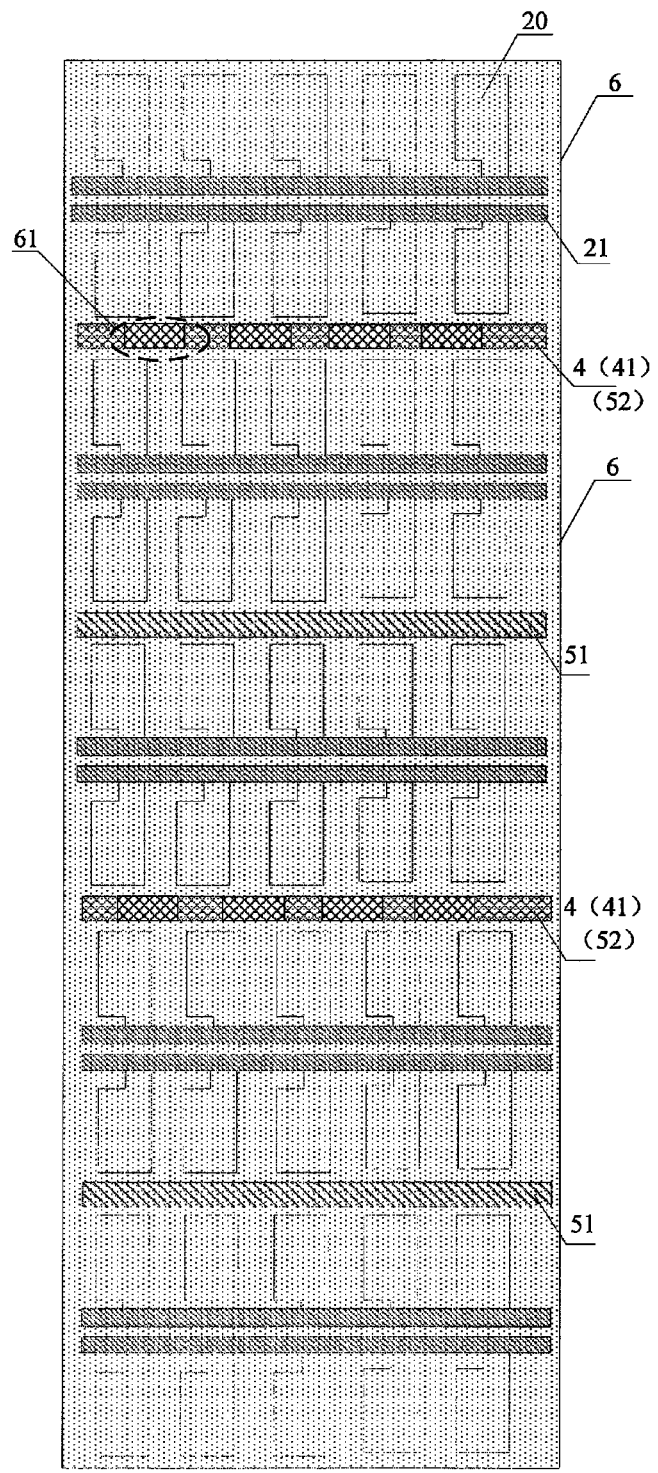
FIG. 7 is a schematic top view of an in-cell touch panel including a second arrangement of common electrodes provided in one embodiment of the present invention.

Preferably, referring to FIG. 7, overlapping area in vertical direction between common electrodes 6 and touch driving electrodes 4 is smaller than that of touch driving electrodes 4. Common electrodes 6 are a entire layer of conducting film layer having a plurality of slits 61 in regions corresponding to touch driving electrodes 4. The slits 61 expose parts of touch driving electrodes 4 that exchange signals with the touch sensing electrodes to implement touch function. In a specific implementation, slits 61 are implemented by making holes in common electrodes 6 in regions corresponding to touch driving electrodes 4.

Figure 8:
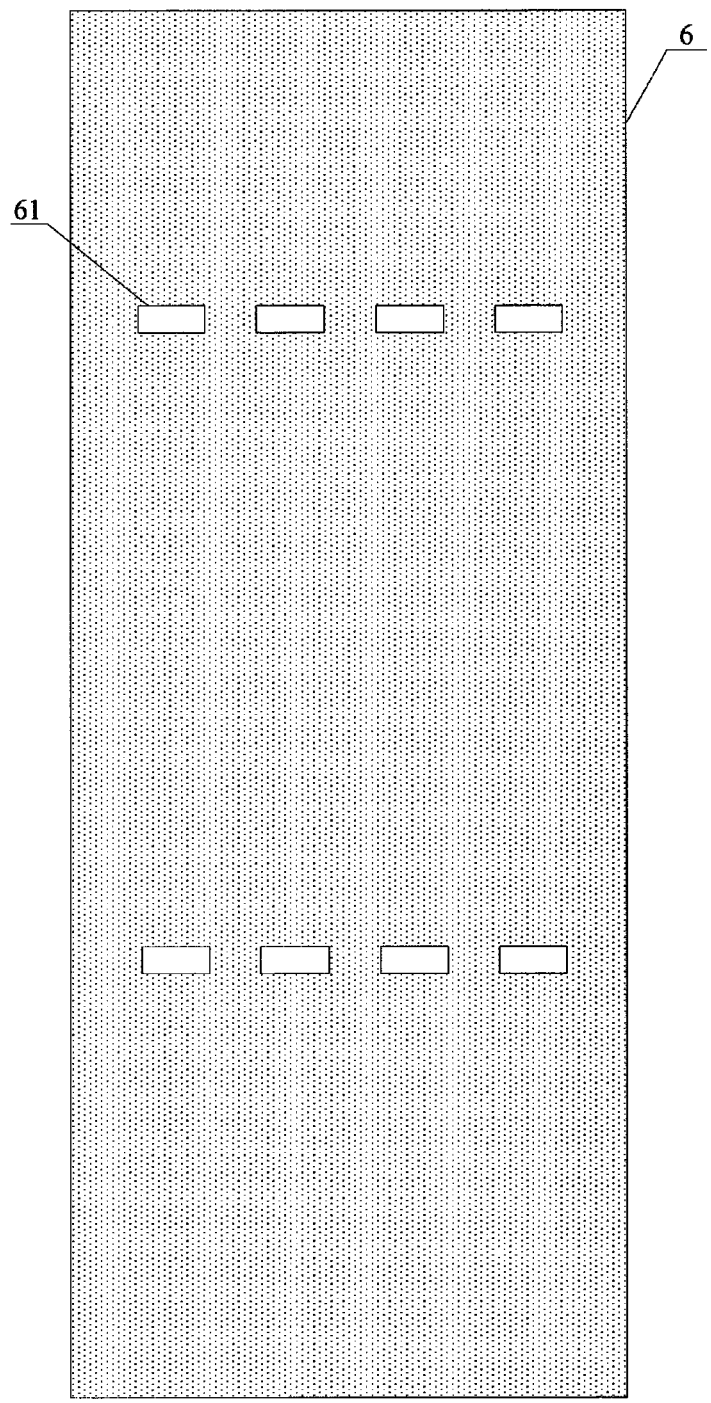
FIG. 8 is a structural representation of common electrodes in the in-cell touch panel shown in FIG. 7.

FIG. 8 is a schematic diagram of common electrodes 6 shown in FIG. 7, which cover the display area (A-A area) of the entire array substrate and have slits 61 disposed thereon.

Figure 9:
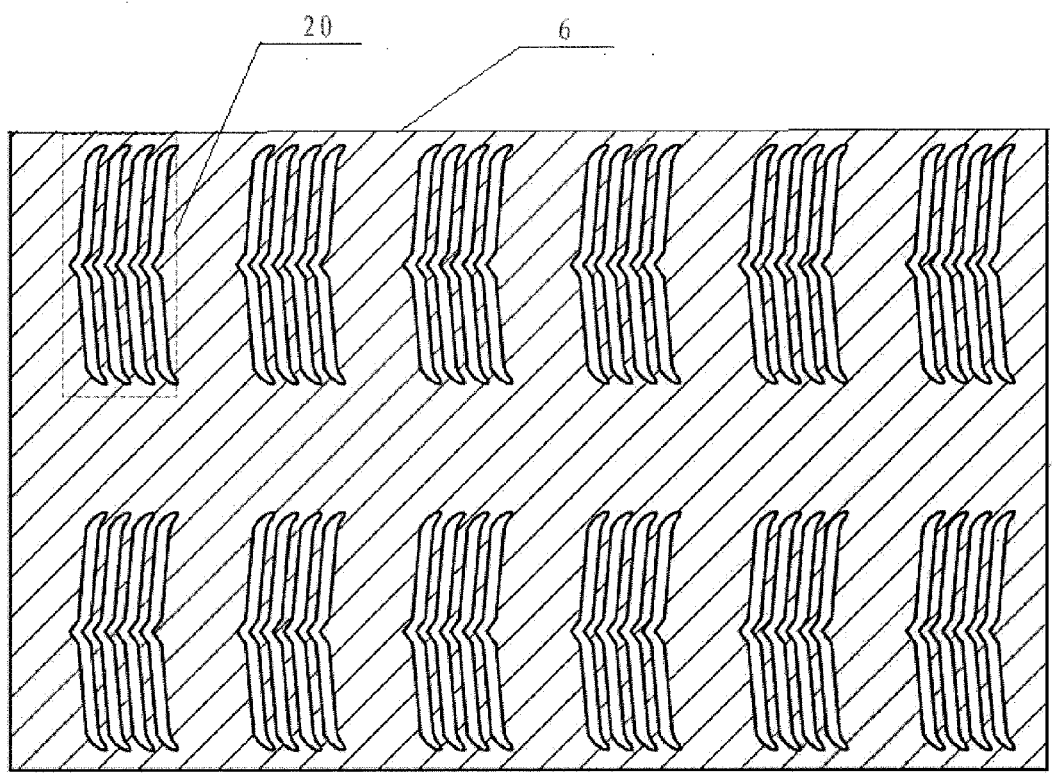
FIG. 9 is a structural representation of slit-like common electrodes in the in-cell touch panel shown in FIG. 6 or FIG. 7.

In order to improve light transmittance of the touch panel, common electrodes 6 are designed as slit-like in regions corresponding to sub-pixel units, as shown in FIG. 9. FIG. 9 is a partially enlarged schematic diagram showing a common electrode 6 provided with slits in a region corresponding to each sub-pixel unit 20.

The touch sensing electrodes provided in embodiments of the present invention will be described in detail below.

Figure 10:
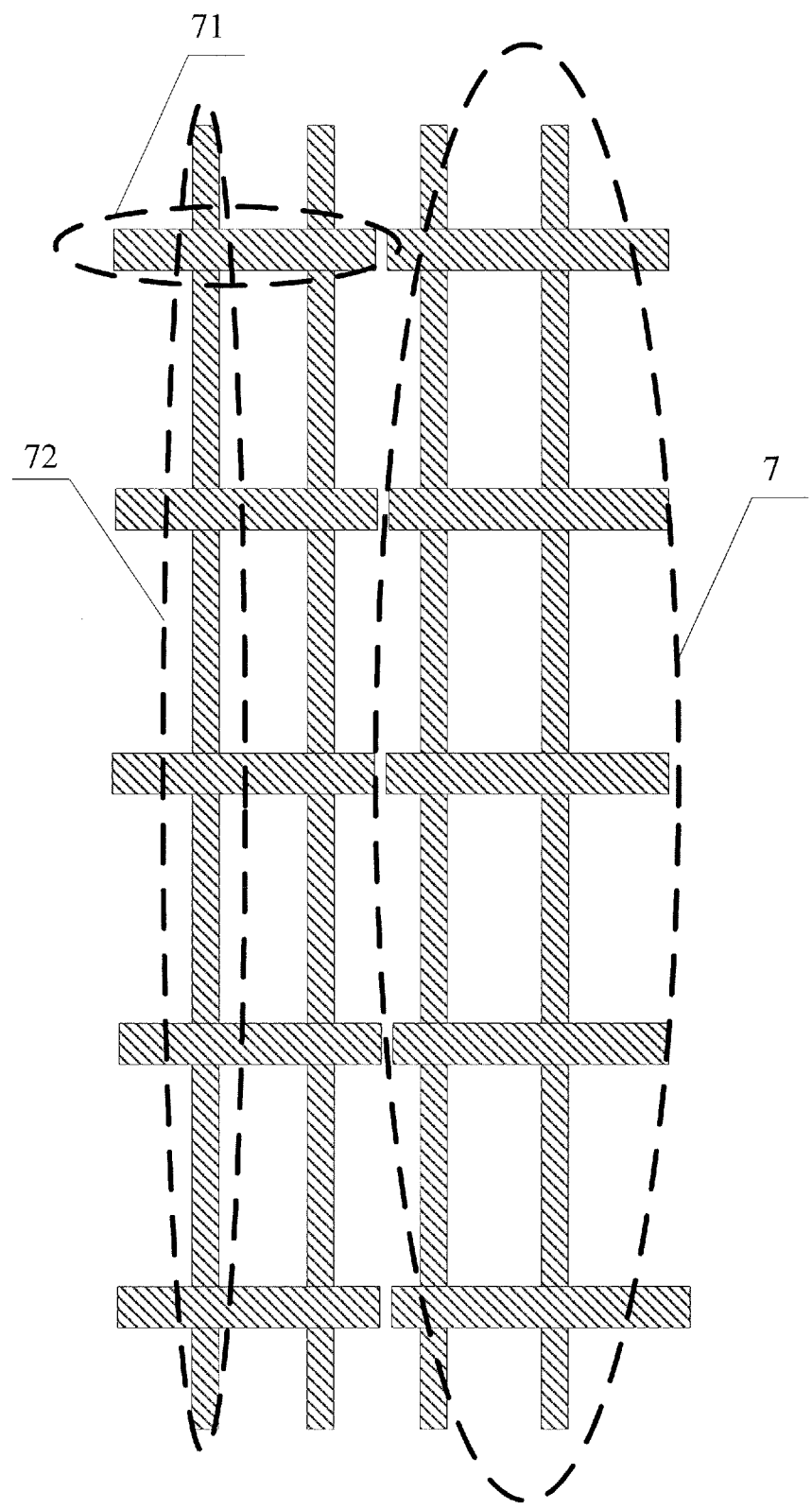
FIG. 10 is a structural representation of touch sensing electrodes provided in one embodiment of the present invention.

Touch sensing electrodes provided in embodiments of the present invention are disposed on the color filter substrate. Referring to FIG. 10, the touch sensing electrodes 7 are of grid-shape.

Grid-like touch sensing electrodes 7 include first touch sensing sub-electrodes 71 distributed in row direction and second touch sensing sub-electrodes 72 distributed in column direction. First touch sensing sub-electrodes 71 and second touch sensing sub-electrodes 72 are electrically connected.

The array substrate further includes data lines disposed on the same layer as gate lines. Data lines are located between two adjacent columns of sub-pixel units.

Figure 11:
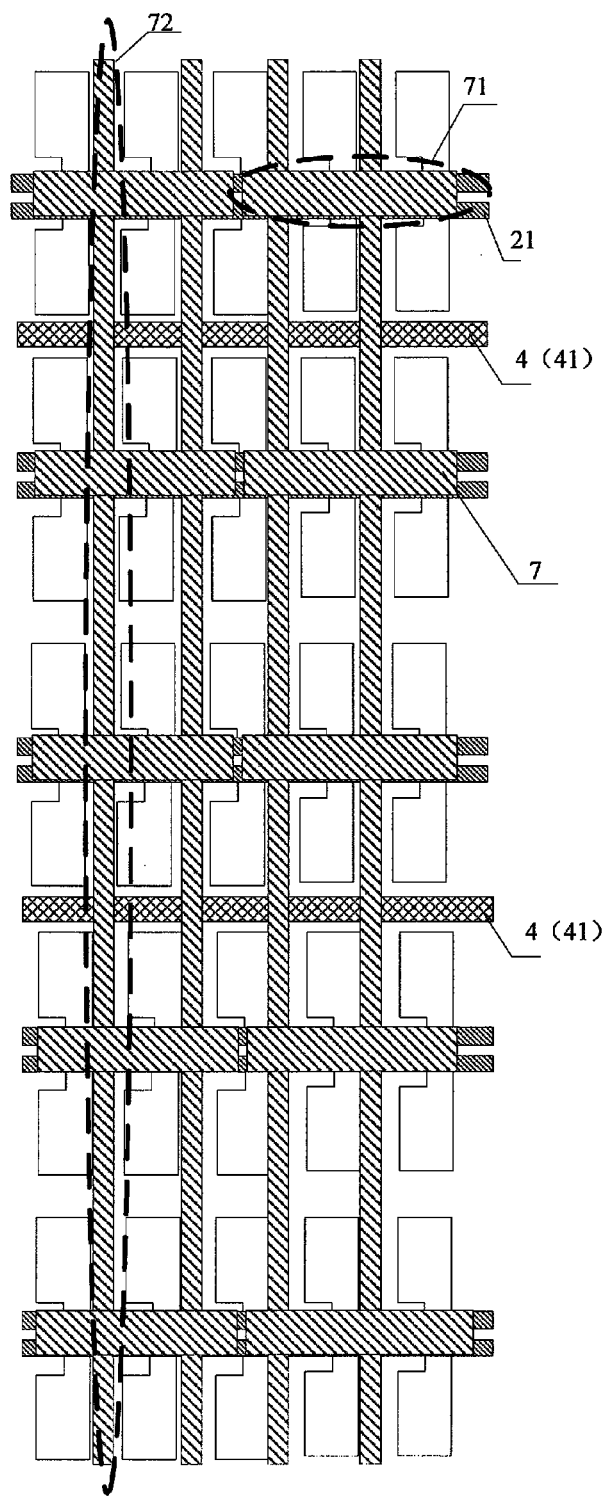
FIG. 11 is a schematic top view of touch driving electrodes and touch sensing electrodes provided in one embodiment of the present invention.

Preferably, referring to FIG. 11, first touch sensing sub-electrodes 71 are located in regions corresponding to gate lines 21 and second touch sensing sub-electrodes 72 are located in regions corresponding to data lines. Data lines are not shown in FIG. 11.

As can be clearly seen from FIG. 11, touch sensing electrodes provided in embodiments of the present invention are located in regions corresponding to gate lines and data lines and do not occupy the pixels' display area so as to increase the opening ratio of the touch panel.

Touch driving electrodes provided in embodiments of the present invention are disposed on the same layer as gate lines and data lines and may be formed in a single manufacturing process. The touch driving electrodes may be electrodes made of metal or alloy material.

The common electrodes provided in embodiments of the present invention are transparent conducting electrodes of such as indium tin oxide ITO or indium zinc oxide IZO.

The principle of touch by touch driving electrodes and touch sensing electrodes provided in embodiments of the present invention will be described briefly below.

Figure 12:
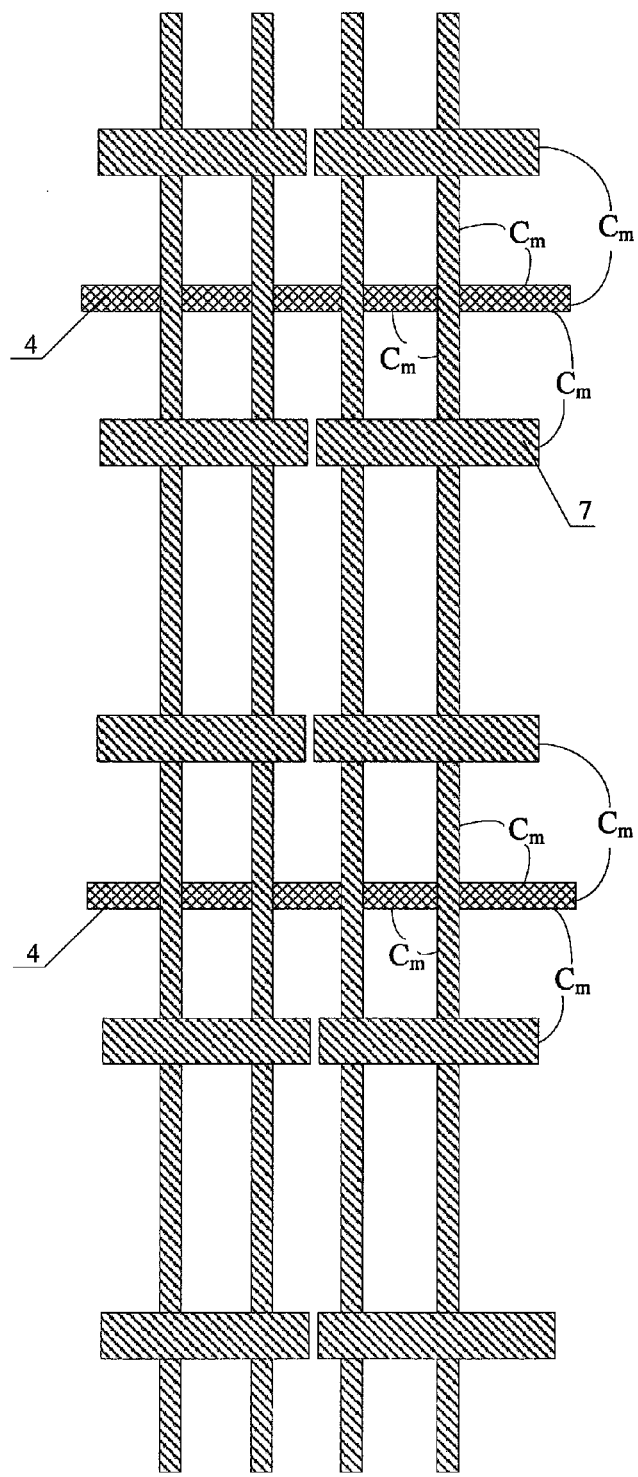
FIG. 12 is a schematic diagram of touch driving electrodes and touch sensing electrodes forming mutual capacitance shown in FIG. 11.

FIG. 12 shows adjacent touch driving electrodes 4 and touch sensing electrodes 7 form mutual capacitance $C_m$. Specifically, each touch driving electrode 4 forms a mutual capacitance $C_m$ with the first touch sensing sub-electrode of the touch sensing electrode 7 aligned in the row direction, and forms a mutual capacitance $C_m$ with the second touch sensing sub-electrode of the touch sensing electrode 7 aligned in the column direction. The magnitude of $C_m$ may be adjusted by adjusting the density of touch driving electrodes 7 so as to design touch sensing electrodes satisfying requirements.

The touch sensing electrodes provided in embodiments of the present invention are completely disposed in regions corresponding to gate lines and data lines, that is, the touch sensing electrodes are completely located directly over gate lines and data lines. In order to prevent signals received by touch sensing electrodes from being interfered by display image signals from the liquid crystal display panel and avoid signal interference in case of commonly use of touch driving electrodes and common electrode signal lines, the touch driving electrodes and common electrode signal lines are driven in a time-division manner.

The operation principle of the in-cell touch panel provided in embodiments of the present invention will be described in detail below with reference to the timing sequence diagram of implementing image display and touch functions shown in FIG. 13.

Figure 13:
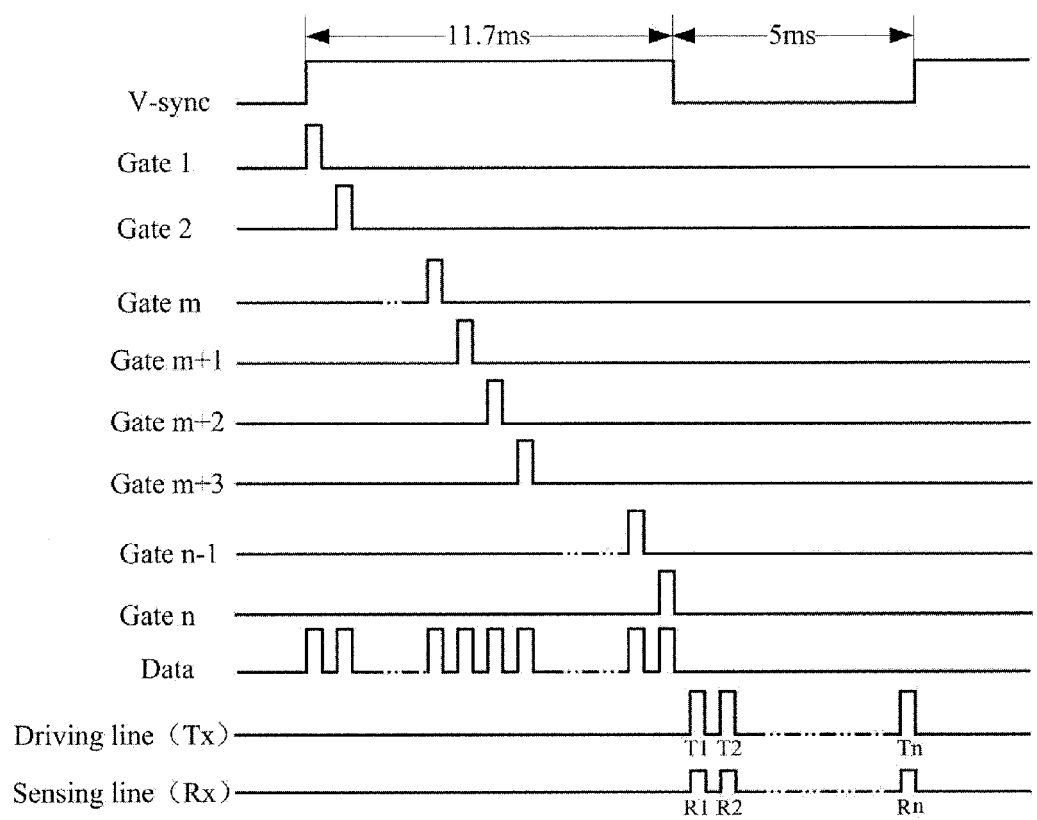
FIG. 13 is a timing sequence diagram for image display and touch functions of the in-cell touch panel provided in embodiments of the present invention.

In FIG. 13, V-sync is the timing sequence signal. In the figure, the timing sequence for n gate lines is shown, in which the n gate lines are respectively gate line 1 (Gate 1), gate line 2 (Gate 2), , gate line m (Gate m), gate line m+1 (Gate m+1), gate line m+2 (Gate m+2), gate line m+3 (Gate m+3), gate line n-1 (Gate n-1) and gate line n (Gate n). In addition to the timing sequence for data lines, the timing sequence for n touch driving electrodes (T1, T2, Tn) and the timing sequence for n touch sensing electrodes (R1, R2, Rn) are also shown in the figure.

As shown in FIG. 13, in the first 11.7 ms of the image display stage, the n gate lines are successively applied with a gate scanning signal voltage, and data lines are applied with the a data signal voltage. The common electrode signal lines are applied with a certain constant voltage for implementing image display. The touch sensing electrodes are not applied with any voltage to avoid influence on image display.

When a frame of image has been displayed, in the touch display stage of 5 ms before displaying the next frame, gate lines and data lines are applied with low level signals to turn off TFTs connected with gate lines, so as to avoid influence on touch process. The touch driving electrodes are applied with a touch driving voltage $V_1$ and the touch sensing electrodes are applied with a constant voltage $V_0$ at the same time. An electric field is formed between the touch sensing electrodes which is applied with voltage $V_0$ and the touch driving electrodes which is applied with voltage $V_1$, thereby realizing touch function.

The above-mentioned 11.7 ms for image display stage and 5 ms for touch display stage are only examples illustrated for explaining the present invention. In specific implementations, the image display stage is not limited to 11.7 ms and the touch display stage is not limited to 5 ms.

One embodiment of the present invention further provides a display device including the above-mentioned in-cell touch panel, which may be display devices such as liquid crystal displays, liquid crystal televisions, organic electroluminescence display OLED panels, OLED displays, OLED televisions or electronic paper.

In summary, embodiments of the present invention provide an in-cell touch panel in which every two adjacent rows of sub-pixel units constitute a sub-pixel unit group, two gate lines for providing gate signals to the two rows of sub-pixel units respectively are provided between these two rows of sub-pixel units; and touch driving electrodes are located between adjacent sub-pixel unit groups. Since gate lines and touch driving electrodes are located at different areas on the array substrate, that is, the gate lines and touch driving electrodes have no vertical overlapping areas, touch driving signals of the touch driving electrodes will not influence gate scanning signals of the gate lines, hence avoiding influence of touch driving signals on image signals. Further, touch driving electrodes are disposed in non-display areas, that is, areas corresponding to the black matrix on the color filter substrate, thereby will not influence the opening ratio of pixels.

It is to be understood that one skilled in the art can made various variations and modifications to the present invention without departing from the spirit and scope of the present invention. Thus, if these modifications and variations of the present invention fall within the scope of claims and equivalents of the present invention, it is intended that the present invention also encompass these modifications and variations.

What is claimed is:

1. An in-cell touch panel comprising a color filter substrate and an array substrate disposed in a cell-assembling manner, a plurality of sub-pixel units arranged in matrix being disposed on said array substrate, wherein said in-cell touch panel further comprises:

a plurality of touch sensing electrodes distributed in a column direction of said sub-pixel units on said color filter substrate, and a plurality of touch driving electrodes distributed in a row direction of said sub-pixel units on said array substrate, every two adjacent rows of sub-pixel units constituting a sub-pixel unit group and gate lines for providing gate signals to these two rows of sub-pixel units being disposed between these two rows of sub-pixel units;

wherein said touch driving electrodes are located in non-display areas between said sub-pixel unit groups;

wherein it further comprises a plurality of common electrode signal lines distributed in the row direction of said sub-pixel units on said array substrate, which comprising first common electrode signal lines and second common electrode signal lines;

said first common electrode signal lines are located between adjacent said touch driving electrodes and in non-display areas between any two adjacent sub-pixel unit groups, and said second common electrode signal lines are said plurality of touch driving electrodes driven in a time-division manner.

2. The in-cell touch panel of claim 1, wherein said touch driving electrodes comprise a plurality of touch driving electrode sub-units parallel with each other and distributed in the row direction and the touch driving electrode sub-units are connected in parallel with each other.

3. The in-cell touch panel of claim 2, wherein a longitudinal width of said touch driving electrode constituted by a plurality of touch driving electrode sub-units is 2 mm~6 mm.

4. The in-cell touch panel of claim 1, wherein said first common electrode signal lines and second common electrode signal lines are alternatively arranged.

5. The in-cell touch panel of claim 1, wherein it further comprises common electrodes located on said array substrate and located over said common electrode signal lines, the common electrodes are electrically connected with said common electrode signal lines, and the common electrodes have no overlapping surfaces in vertical direction with said touch driving electrodes.

6. The in-cell touch panel of claim 1, wherein it further comprises common electrodes located on said array substrate and located over said common electrode signal lines, the common electrodes are electrically connected with said common electrode signal lines, the common electrodes are provided with a plurality of slits in regions corresponding to said touch driving electrodes, and the areas of overlapping surfaces in vertical direction between the common electrodes and said touch driving electrodes are areas of said slits.

7. The in-cell touch panel of claim 1, wherein said touch sensing electrodes are of grid like, the grid-like touch sensing electrodes comprise first touch sensing sub-electrodes distributed in row direction and second touch sensing sub-electrodes distributed in column diretion, said first touch sensing sub-electrodes and said second touch sensing sub-electrodes are electrically connected.

8. The in-cell touch panel of claim 7, wherein it further comprises a plurality of data lines distributed in the column direction located on said array substrate and located on non-display areas, said first touch sensing sub-electrodes are located in regions corresponding to said gate lines and said second touch sensing sub-electrodes are located in regions corresponding to said data lines.

9. A display device comprising the in-cell touch panel according to claim 1.

* * * * *